April 3, 1962     I. F. WEEKS     3,028,327
CLOSED-CYCLE WATER-BOILER REACTOR Filed May 12, 1953     6 Sheets-Sheet 1

FIG. 1

INVENTOR.
IVAN F. WEEKS
BY
William R. Lane
ATTORNEY

April 3, 1962     I. F. WEEKS     3,028,327
CLOSED-CYCLE WATER-BOILER REACTOR Filed May 12, 1953     6 Sheets-Sheet 2

INVENTOR.
IVAN F. WEEKS
BY *William R. Lane*
ATTORNEY

April 3, 1962 I. F. WEEKS 3,028,327
CLOSED-CYCLE WATER-BOILER REACTOR
Filed May 12, 1953 6 Sheets-Sheet 3

INVENTOR.
IVAN F. WEEKS
BY William R. Lane
ATTORNEY

INVENTOR.
IVAN F. WEEKS

United States Patent Office 3,028,327
Patented Apr. 3, 1962

3,028,327
CLOSED-CYCLE WATER-BOILER REACTOR
Ivan F. Weeks, Whittier, Calif., assignor to North American Aviation, Inc.
Filed May 12, 1953, Ser. No. 354,569
23 Claims. (Cl. 204—193.2)

This invention relates to homogeneous nuclear reactors, and particularly to a closed cycle water boiler reactor.

A nuclear reactor is an apparatus in which a sustained chain reaction of nuclear fission occurs. A homogeneous nuclear reactor is one in which the fuel or fissionable material is substantially uniformly distributed in a moderating material. A moderating material or moderator is a substance which slows down the neutrons produced by the nuclear fission without substantial absorption of the neutrons. In a water boiler reactor or a liquid homogeneous reactor a soluble salt containing the fissionable material is dissolved in a suitable solvent. Since the solvent also acts as the moderator of the reactor, it shoulder preferably have a good scattering cross section and a low atomic weight. In the past the salts, uranyl sulfate, $UO_2SO_4$, and uranyl nitrate, $UO_2(NO_3)_2$, dissolved in water have each been used successfully to obtain a self-supporting chain reaction. At this point it is well to note that in order to sustain a self-supporting chain reaction in a reactor the mass of fissionable material in the core of the reactor must be at least a minimum value commonly called the critical mass. Any solution containing less than this critical mass does not sustain a self-supporting chain reaction.

In the uranyl sulfate or uranyl nitrate solutions previously mentioned some of the uranium in the salt is a highly fissionable isotope of uranium, U–235. Uranium, as it occurs in nature, always contains some U–235. The uranium salt used in the reactor solution is preferably enriched with U–235, i.e. the concentration of the isotope U–235 is increased above the normal concentration in natural uranium. The use of highly enriched, i.e., 93.5%, uranyl salt is preferred, especially if the salt is a nitrate. As will be pointed out later, the amount of nitrogen gas formed by the decomposition of the ntirate ion varies inversely with the enrichment. Utilizing enriched uranium also reduces the size of the core of the reactor and the magnitude of the critical mass.

If the enriched uranyl salt solution in water is placed in a stainless steel sphere about one foot in diameter and surrounded by a suitable reflector, the magnitude of the critical mass of U–235 is between 600 and 800 grams. The exact value of the critical mass depends on the design of the reactor, the type of solute used, and the enrichment of the solute. Such reactor design factors as the size, thickness and composition of the stainless steel sphere; the size, length and composition of any cooling coils; the type of coolant; and the size and type of reflector influence the exact magnitude of the critical mass. The design of the irradiation facilities also influences the magnitude of the critical mass. It is usually necessary for continued operation of a reactor to increase the amount of fissionable material to a value above criticality. That is, an additional amount of U–235 is added to the solution to make allowance for fuel burn-up, fission product poisoning, and control rod absorption, and further to produce an increase in the density of the neutron flux generated by the reactor.

A preferred water boiler reactor has a core consisting of a stainless steel spherical container in which is placed an enriched uranyl salt solution in water. A suitable neutron reflector surrounds the core, and a radiation shield encases the outside of the reflector. The radiation shield has suitable openings for control rod equipment and irradiation facilities such as a thermal column, central exposure facility, exposure ports and other auxiliary apparatus for utilizing the neutron flux. Shield designs are well known in the art and need not be further described here. Under operating conditions there is a continuous formation of hydrogen and oxygen in the core due to the decomposition of the water solvent under irradiation. The negative radicals of certain types of solutes also decompose under irradiation forming gases. An example of this type of solute is the decomposition of the nitrate ion, $NO_3$, under irradiation ultimately forming some gaseous nitrogen and oxygen. In addition, the fission process results in the formation of certain gaseous fission products from the break-up of the U–235 atom. Xenon and krypton are the most prevalent of these products. In the past, all of these gaseous products have been removed from the core by continuously flushing the upper surface of the solution with air and venting to the atmosphere. Since the fissionable products, xenon and krypton, are radioactive gases with a comparatively long half-life, past practices have required an elaborate delay system prior to the release of these gases into the surrounding atmosphere. Despite these elaborate precautions the gases were still materially radioactive at the time of release.

Thus, in the past, the gaseous fission products and decomposition gases caused by the fission reaction have been conducted through long pipes and delay traps and finally vented to the outside atmosphere through a very high stack. The further dilution of the gases was then a function of the prevailing wind and weather conditions. This method of disposition of the gases severely limits the number of localities in which present water boiler reactors can be built. Not only must the area be sparsely populated to prevent endangering inhabitants, but also the prevalent weather must satisfy certain minimum conditions to prevent the contamination of the surrounding area by the settlement and concentration of the radioactive gases. It is further to be noted that because of the loss of hydrogen and oxygen from the decomposition of water and of nitrogen and oxygen from the decomposition of the nitrate ion, the reactor's solution must be renovated by the periodic addition of distilled water and nitric acid. If nitric acid is not added to the core of a uranyl nitrate water boiler reactor, precipitation of the uranium in the form of $UO_4$ takes place. Therefore, the water boiler reactors which have been constructed in the past have two marked disadvantages. First, it is necessary to periodically add fluids to the solution to replace that lost by decomposition; and second, it is necessary to exercise elaborate precautions in disposing of the radioactive gases to prevent contamination of the surrounding area. Because of the latter disadvantage, reactors of this type cannot be used in congested areas but must be placed in a locale where they cannot endanger the health of the surrounding community. The primary utility of a water boiler reactor is in irradiation treatment in hospitals and in the nuclear research facilities of universities. Both of these facilities are usually located in congested areas where the gas efflux could not be vented to the atmosphere. Therefore, there has been a great need for an unvented water boiler reactor.

It is therefore an object of this invention to provide an unvented water boiler reactor.

It is another object of this invention to provide an enriched homogeneous water boiler reactor in combination with a closed cycle gas recombiner system.

It is a further object of this invention to provide a water boiler reactor which can be safely operated in any locale.

It is another object of this invention to provide a water boiler reactor in which the contamination of the surrounding area with radioactive material is prevented even under runaway conditions.

It is a further object of this invention to provide means for safely disposing of the gaseous fission products of a homogeneous water boiler reactor without venting to the atmosphere.

It is a further object of this invention to provide a closed cycle water boiler reactor, the gaseous portion of which operates below atmospheric pressure and in which none of the gases are vented to the atmosphere.

It is another object of this invention to provide a water boiler reactor which utilizes a closed cycle recirculating system operating in an oxygen atmosphere in which gas recombiners recombine the decomposition gases formed by irradiation of the solution in the core and in which means are provided for the periodic or continuous disposal of the gaseous fission products without venting to the atmosphere.

It is a further object of this invention to provide a closed cycle water boiler reactor having an enriched uranyl sulfate solution in water and a recirculating, oxygen-atmosphere, gas recombiner system in which a hydrogen-oxygen recombiner continuously recombines the hydrogen and oxygen formed by irradiation of the water solvent and in which means are provided for the periodic or continuous removal of the gaseous fission products without venting to the atmosphere.

It is a further object of this invention to provide a closed cycle water boiler reactor having an enriched uranyl nitrate solution in water and a recirculating, oxygen-atmosphere, gas recombiner system in which a hydrogen-oxygen recombiner continuously recombines the hydrogen and oxygen formed by the irradiation of the water solvent, in which a nitrogen-oxygen recombiner continuously recombines the nitrogen and oxygen ultimately formed by the irradiation of the nitrate ion and in which means are provided for the periodic or continuous removal of the gaseous fission products.

Other objects of invention will become apparent from the following description taken in connection with the accompanying drawings, in which.

Before describing in detail the specific recombiner systems contemplated by this invention, a brief analysis of the sources and types of gases which are to be recombined or otherwise disposed of will be made. For the purposes of explanation, two basic types of solutions are considered. The first type of solution contains salt ions which are not materially reduced by irradiation; the second type of solution contains salt ions which do decompose into gases under irradiation. As an example of the first type, consider an enriched uranyl sulfate solution in water. It has been discovered that the sulfate ion is substantially unaffected by the fission process. However, hydrogen peroxide is formed by the irradiation of water, espcially with dissolved oxygen present and reacts with the $UO_2SO_4$ to form $UO_4$ and $H_2SO_4$. Concentrated $H_2SO_4$ under irradiation forms a very small amount of gaseous $SO_2$. However, the stability of the hydrogen peroxide is reduced by acidifying the solution with sulfuric acid, or by raising the temperature of the solution. By either of these means the precipitation of $UO_4$ from the solution is eliminated and the small amount of $SO_2$ liberated is reduced to a negligible amount which can be recirculated in the system and removed at the time the fuel is finally replenished. Thus, there is no ion gas problem when a sulfate salt is used.

The water solvent of this solution does decompose under irradiation forming hydrogen and oxygen. The amount of gases thus formed are of the order of 17 liters per reactor kilowatt hour. Reactor kilowatt hours are a measure of the energy generated by the reactor. The hydrogen-oxygen recombiner in the system is designed to recombine the hydrogen and oxygen at the same rate as they are formed while maintaining the hydrogen concentration in the recirculating gases below a predetermined value, as will be explained later. An example of the second type of solution is enriched uranyl nitrate dissolved in water. In addition to the hydrogen and oxygen formed by the decomposition of water under irradiation, the nitrate ion is also subject to decomposition. The nitrate ion when subjected to irradiation is decomposed into a nitrate ion and oxygen. The nitrite ion in an acid solution is unstable and rapidly converts to nitric oxide (NO) and nitric acid. Of the two products nitric oxide alone presents disposal problem. Nitric oxide under irradiation produces nitrogen, oxygen and nitrogen dioxide. Since the latter is the anhydride of nitric acid, only the nitrogen and oxygen formed need be considered.

At this point is is well to note that by increasing the enrichment of the uranyl nitrate solution in the water boiler reactor of this invention the amount of nitrogen and oxygen produced is greatly reduced. An explanation of the reasons for this is as follows. Consider a molecule of the salt which contains a U–238 uranium atom as "normal" uranyl nitrate and a molecule of the salt which contains a U–235 uranium atom as "fissionable" uranyl nitrate. Increasing the enrichment of the salt increases the relative amount of "fissionable" uranyl nitrate in a unit mass of the salt. This increased enrichment results in a decrease in the number of nitrate ions in the reactor core for two reasons. First, the number of molecules of fissionable uranyl nitrate needed to become critical is decreased because the critical mass decreases with increased enrichment. This means a lower number of nitrate ions are placed into the solution by the fissionable uranyl nitrate. Second, the amount of normal uranyl nitrate added to the solution is greatly reduced since the concentration of fissionable uranyl nitrate in the mixture has increased. Thus, the number of nitrate ions in the solution is greatly reduced by using a highly enriched salt. There is therefore a corresponding decrease in the amount of NO produced. The amount of nitrogen and oxygen ultimately formed is even further reduced in the reactor of this invention since, as is pointed out later, an oxygen carrier medium is used to recirculate the gases through the recombiner system. This results in a large increase in the amount of oxygen dissolved in the solution with a corresponding greater tendency for NO to oxidize to $NO_2$ rather than decompose to nitrogen and oxygen.

As mentioned above the recombiner system of this invention is preferably operated with an atmosphere of oxygen at slightly below atmospheric pressure as the carrier medium. Thus, substantially pure oxygen acts as the carrier to convey the gases through the recombiner system and there is always an excess amount of oxygen available to recombine with the decomposition gases in the recombiners. It is to be noted that although hydrogen and oxygen in certain proportions form an explosive mixture which detonates when subjected to a spark, if the hydrogen concentration is maintained below 4.65 percent by volume the mixture neither propagates a flame nor a detonation. For this reason the hydrogen-oxygen recombiner is designed with a capacity sufficient to establish a condition of equilibrium in which hydrogen and oxygen are recombined at the same rate as they are formed in the solution. At the same time the concentration of hydrogen is maintained below the lower limit of inflammability at all times and at all points in the system. Thus, not all of the hydrogen passing through the recombiner need be recombined but only that amount which is necessary to establish the equilibrium, while maintaining the hydrogen concentration below the lower explosive limit.

Figure 1:
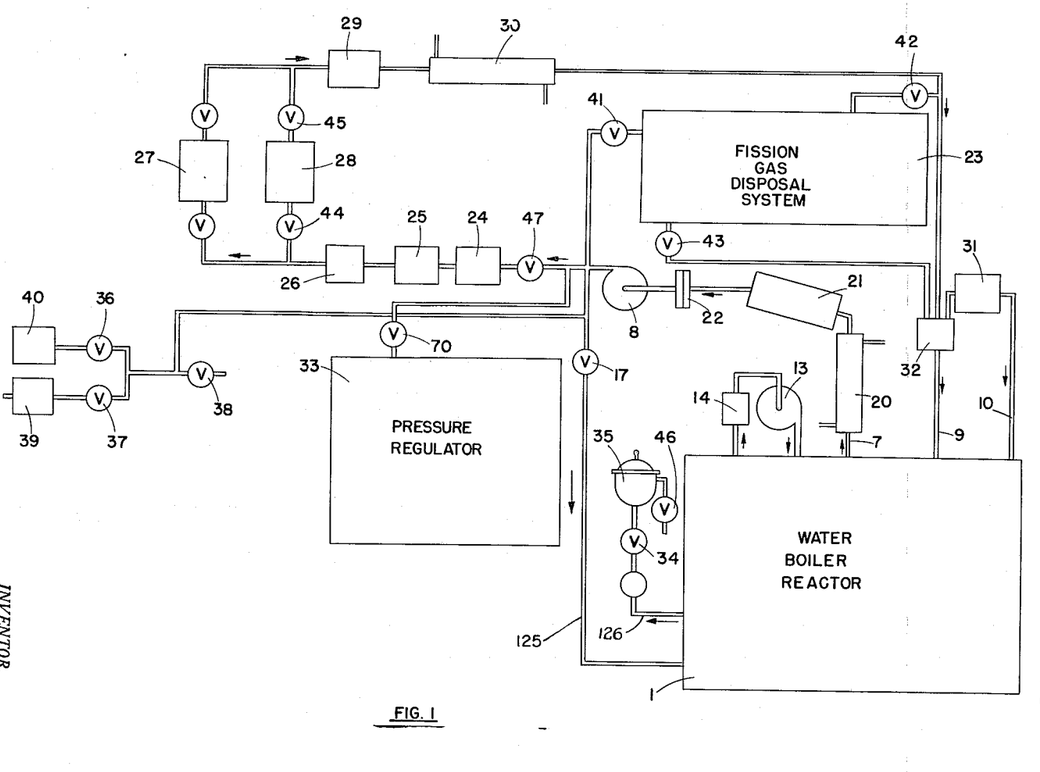
FIG. 1 is a schematic flow diagram of a preferred embodiment of a combined water boiler reactor and sealed closed cycle gas recirculating system contemplated by this invention.

Referring now to FIG. 1, a schematic diagram of a preferred embodiment of the unvented closed cycle gas recirculating system of the water boiler reactor contemplated by this invention is shown. This reactor utilizes a solution previously designated as the first type, i.e., one in which the ions of the salt do not materially decompose under irradiation. Reactor 1, shown in detail in FIG. 2, includes core 2, reflector 3, radiation shield 4, and control and safety rods 92 and 93. Reflector 3 is of conventional design and is composed of water, deuterium oxide, beryllium oxide or graphite. The construction of shield 4 is also a conventional lead, cadmium, and concrete shield and is built with suitable irradiation facilities. Control rod 92 and safety rod 93 are also of conventional design and may be positioned either horizontally or vertically. Safety rod 93 is preferably actuable in response to an electric signal to shut down the reactivity of core 2. Core 2 is preferably a sphere 5 made of type 347 stainless steel and filled with an enriched solution 6 of fissionable material. Tube 7 is positioned with its lower opening a few centimeters above the normal operating level of solution 6 in sphere 5. The gases formed in solution 6 rise to the surface and are conducted away from core 2 through tube 7. These gases are continuously recirculated by blower 8 through the closed cycle gas recirculating system and the recombined products returned to sphere 5 through tubes 9, 10, and 11.

Figure 2:
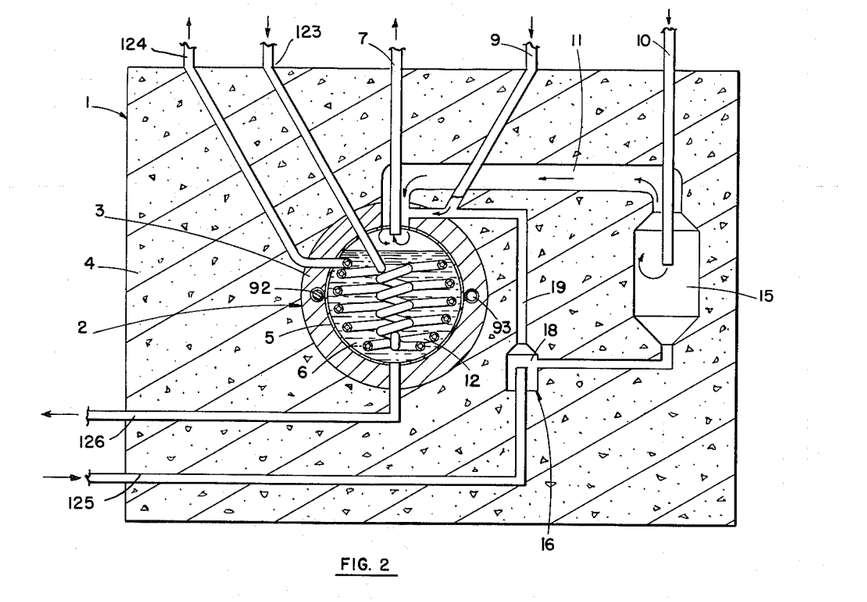
FIG. 2 is a schematic sectioned view of a preferred water boiler reactor utilized in this invention.

A considerable amount of heat is generated by the fission process in solution 6. This heat must be dissipated as rapidly as it is generated in order to prevent boiling and frothing of solution 6. A reactor is generally rated by the amount of heat that is generated in the solution per unit time. This rating is given in watts. Thus, a 50 kw. water boiler reactor generates 50 kilowatts of heat. This amount of heat cannot be dissipated through the walls of the reactor without raising the temperature of the solution far above its boiling point. Therefore, stainless steel cooling coils 12 are provided in a symmetrical arrangement inside spherical container 5. A coolant, preferably distilled water, is continuously recirculated through coils 12, variable speed pump 13, and heat exchanger 14. The coolant enters the reactor into coils 12 through tube 123 and leaves through tube 124 into heat exchanger 14. By varying the speed of pump 13, the flow of coolant is adjusted to maintain the temperature of solution 6 at approximately 80° C.

As previously pointed out, the water boiler reactor of this invention is adapted to operate without any danger of contaminating the surrounding area or atmosphere. If either accidentally or by deliberate sabotage control rod 92 is rapidly removed, a very rapid increase in power occurs, resulting in a reactor runaway. The heat resulting from this rapid increase in power cannot be dissipated by cooling coils 12. Solution 6 therefore starts to boil and froth greatly increasing the likelihood of a leak occurring in the system. For this reason regurgitation chamber 15 is provided and communicates with container 5 through a large tube 11. The liquid solution ejected out of container 5 readily flows through tube 11 to regurgitation chamber 15. After some of the solution is ejected the mass of fissionable material in container 5 is no longer sufficient to sustain a chain reaction and fission ceases. After the cause of the runaway is rectified, the solution in regurgitation chamber 15 is returned to container 5 by bubble pump 16. This is accomplished by admitting oxygen through valve 17 from the high pressure side of blower 8 through tube 125 to bubble pump 16. By bubbling action the solution in cavity 18 of pump 16 is raised through tube 19 and returned to container 5. A small amount of oxygen is preferably allowed to continuously flow through valve 17 to thereby return to container 5 any water which may become trapped in cavity 18.

The preferred gas recirculation system is composed of condenser 20, solid entrainment filter 21, flowmeter 22, sealed blower 8, fission gas disposal system 23, heater 24, hydrogen detector 25, explosion trap 26, hydrogen-oxygen recombiners 27 and 28, explosion trap 29, condenser 30, hydrogen detector 31, water trap 32, pressure regulator 33, and the interconnecting tubes and valves. The component parts, tubes and valves are preferably constructed of a material having high resistance to corrosion by acids and good resistance to oxidation. Type 347 stainless steel has these desired properties. The entire gas recirculating system is completely sealed from the outside atmosphere at all times during operating conditions.

Assuming the entire gas recirculating system including sphere 5 is initially filled with air, the water boiler reactor is placed in an operating condition as follows. Initially valve 34, positioned between sphere 5 and solution filler vessel 35, is closed. Inlet valve 36, evacuation valve 37, and outlet valve 38 are also closed. All of the other valves in the system are open. Eacuation valve 37 couples vacuum pump 39 to the system. Pump 39 is actuated thereby evacuating the entire system. After substantially all the air has been removed, valve 37 is closed and valve 36 is opened. Valve 36 couples the system to source 40 of oxygen. The gas recirculating system is thereupon filled with oxygen at slightly below atmospheric pressure. By repeatedly evacuating and filling with oxygen several times, the entire gas recirculating system is filled with substantially pure oxygen. The pressure of the oxygen in the system is adjusted to a predetermined amount below atmospheric pressure. The exact value is determined by the comparative volume of the solution to be added and the volume of the entire system. Valve 36 is then closed during operation of the reactor. After the solution has been added and blower 8 turned on, the highest pressure in the gas recirculating system should still be about three inches of water below that of the outside atmosphere. After the final filling with oxygen and the pressure adjustment, valve 36 is closed, sealing the system from the outside atmosphere. Fission gas disposal system 23 is now preferably isolated from the gas recombiner system by closing valves 41, 42, 43. At this point it is well to note that although the preferred method of operation specifies the isolation of fission gas disposal system 23, it is anticipated that the gaseous fission products can be continuously removed by splitting the flow of recirculating gases at the output side of blower 8, a part going through recombiners 27 and 28 and the rest going through disposal system 23. Valves 44 and 45 are closed placing hydrogen-oxygen recombiner 28 in a standby condition. Blower 8 is actuated thereby starting the continuous recirculation of the oxygen-carrier medium through the gas recombiner system.

The water boiler reactor is now ready for the addition of a solution of enriched uranyl sulfate salt in distilled water. Approximately one liter of the solution is placed in filler vessel 35. The cover to vessel 35 is then sealed and valve 46 is opened thereby connecting a source (not shown) of oxygen to filler vessel 35. Valve 34 is then opened and the solution flows into sphere 5. Tube 126 is the return line from sphere 5 to vessel 35. By repeating the process, sphere 5 is filled to the proper level. For a sphere having a diameter of approximately one foot, about 13.5 liters of the solution are needed. The total weight of U–235 added by this means exceeds the critical mass by a predetermined amount. Although the exact magnitude of this mass depends on the particular reactor design, as previously pointed out, approximately 850 grams of U–235 are needed to operate the reactor at 50 kw. power. This is an excess over the amount needed to sustain a self-supporting chain reaction and therefore permits considerable control over the reactor. The reactor is placed in operation, by adjusting control rod 92 in a normal manner. An alternate method of adding the solution is to first add about 10.5 liters of distilled water and then add three liters of more highly concentrated uranyl sulfate solution taking appropriate precautions to insure a thorough mixing of the liquids in sphere 5. This latter method is perhaps more convenient since only three liters of the salt solution need be handled.

The gas recombiner system contemplated by this invention can best be described by explaining the operation of the various component parts in the order in which the recirculating gases pass through the system. The hydrogen, oxygen, and gaseous fission products formed in the solution accumulate above the surface of solution 6. The recirculating oxygen carrier mixes with these gases and conveys them through the rest of the system. Initially the gases leave sphere 5 through tube 7 and are conveyed to reflux condenser 20. At the temperature of operation of the solution, approximately 80° C., the gases contain a considerable amount of water vapor which is carried along with the gases to condenser 20. Since the circulation of this water vapor through the gas recombiner system is undesired, condenser 20 operates to condense this water vapor. The condensate flows back through tube 7 to the solution.

To insure that no entrained solid or liquid is conveyed to the rest of the recirculating system by the gases, the gases are passed through solid entrainment filter 21. Filter 21 preferably consists of a stainless steel tank filled with stainless steel wool. The tank is preferably tilted at an angle thereby allowing the liquid to flow back into sphere 5 through tube 7. Entrainment filter 21 may be any means which prevents the passage of solid or liquid particles while permitting the free flow of the gases. The gases which flow out of filter 21 are primarily the oxygen carrier with small volumes of hydrogen and oxygen formed by the decomposition of the water solvent under irradiation and a very small volume of the gaseous fission products.

The rate of flow of the gases is measured by flowmeter 22 which generates an electrical signal output which is a function of the volumetric flow of gases through the meter. The gases pass through blower 8, the rotor of which is completely sealed from the outside atmosphere and which is designed to circulate the gases through the system at a constant rate. Normally open valve 47 couples the output of blower 8 to heater 24. Heater 24 raises the temperature of the gases to approximately 200° C. This increase in temperature is desired in order to increase the efficiency of catalytic recombiners 27 and 28. Heater 24 consists merely of a hot surface over which the gases are conveyed. The temperature of the surface and the corresponding temperature of the outlet gases are controlled by any conventional adjustable heating means, such as a resistance heating coil in conjunction with an outlet thermocouple and appropriate electronic controls. The gases are then conveyed to hydrogen detector 25 which has an electrical signal output which is a function of the volumetric concentration of hydrogen in the gases. Detector 25 is preferably a thermo-conductive cell which utilizes the high thermal conductivity of hydrogen as opposed to the low thermal conductivity of the oxygen carrier to determine the concentration of hydrogen in the recirculating gases. The electrical output of hydrogen detectors 25 and 31 serve two useful purposes. First, as previously pointed out, an increase in the hydrogen volumetric concentration above 4.65% creates an explosive hazard. By appropriate electronic and mechanical devices (not shown) well-known to those skilled in the art, detectors 25 and 31 operate to actuate safety rod 93 whenever the hydrogen concentration exceeds a predetermined amount. Further a comparison of readings of hydrogen detector 25 with hydrogen detector 31 taken together with the known rate of flow from flowmeter 22 provide an indication of the power level at which the reactor is operating.

Explosion trap 26 which is preferably merely a stainless steel tank filled with stainless steel wool or ribbon is effective in quenching any hydrogen-oxygen explosion which might occur in recombiners 27 and 28 and start to travel back through the rest of the recombiner system. Explosion trap 29, which is identical in construction to trap 26, located on the outlet side of recombiners 27 and 28 to complete the isolation of an explosion in the recombiners. The incorporation of explosion traps 26 and 29 is merely an additional safety feature. Prior to any possibility of acquiring an explosive mixture of hydrogen and oxygen in the system, hydrogen detectors 25 and 31 should operate to shut down the reactor by releasing the safety rod.

Figure 3:
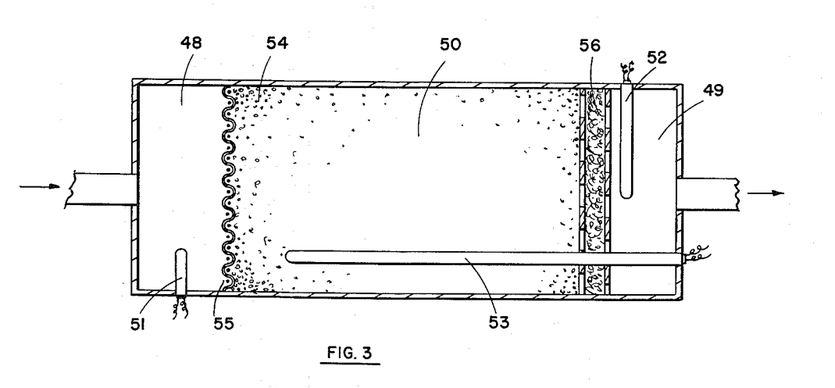
FIG. 3 is a sectioned view of a catalytic hydrogen-oxygen recombiner utilized in the preferred embodiment of this invention.

Hydrogen-oxygen recombiner 27 is essentially a catalyst-bed type recombiner utilizing platinized alumina pellets as the catalyst to cause recombination of the hydrogen and oxygen in the gases. A specific hydrogen-oxygen recombiner design is shown in FIG. 3. The recombiner consists of inlet chamber 48, output chamber 49, and catalyst chamber 50. Thermocouples 51, 52, and 53 are positioned to measure the inlet, outlet, and bed temperatures, respectively, of the gases passing through recombiner 27. The thermocouples give electrical signal outputs which are functions of the temperature of the inlet and outlet gases and of catalyst pellets 54. The temperatures indicated by thermocouples 51 and 52 are conveniently utilized to obtain an indication of reactor power. The magnitude of the temperature rise across the catalyst bed is practically a straight line function of the reactor power. Thermocouple 53 indicates the degree of deterioration of catalyst pellets 54 in recombiner 27. As the reaction zone moves deep into chamber 50, the time has come to replace recombiner 27 with recombiner 28. The recirculating gases enter chamber 48 and pass through fine mesh screen 55 which holds catalyst pellets 54 in place. In the catalyst bed a high percentage, although usually not all, of the hydrogen is recombined with the oxygen to form water vapor. The recirculating gases then pass through filter 56 into exit chamber 49. Filter 56 prevents any possible catalyst dust from being conveyed to the reactor core. Catalyst recombiner 28, which is identical to recombiner 27, is normally maintained in a standby condition to be used in case of damage or burn out of recombiner 27.

The water vapor formed in the recombiner is condensed in aftercondenser 30. The water condensate is trapped by water trap 32. The water thus removed is returned through tube 9 to solution 6.

All of the remaining recirculating gases continue to flow to hydrogen afterdetector 31. Detector 31 is similar in construction to detector 25. By comparing the readings of the two detectors, an indication of the efficiency of recombiners 27 and 28 is obtained. Further, an excessive reading by either detector 25 or 31 actuates the safety rods shutting down the reactor before an explosive mixture of hydrogen and oxygen is formed. The gases are then returned to sphere 5 through tubes 10 and 11, and after passing over the surface of the solution in sphere 5, sweep out the new products formed by the solution through tube 7. The hydrogen and oxygen formed by the decomposition of water under irradiation are therefore continuously recombined and the products of the recombination returned to the solution in the water boiler. Thus, no loss of water occurs.

Figure 4:
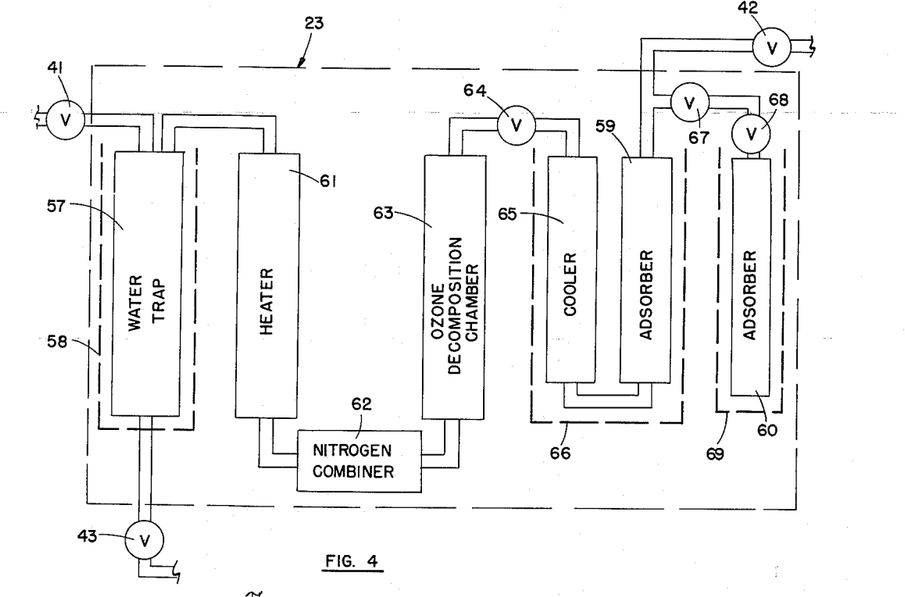
FIG. 4 is a schematic flow diagram of an unvented fission gas disposal system utilized in the preferred embodiment of this invention.

As previously pointed out, in addition to the hydrogen and oxygen formed by the decomposition of water under irradiation, gaseous fission products, principally krypton and xenon, are produced in the solution. Also, inleaks of air from the atmosphere may occur necessitating disposal of gaseous nitrogen. Since krypton and xenon are unaffected by any of the components previously described, they continue recirculating through the system. Initially, these gases are only a very minute portion of the total gases. Eventually, after the reactor has been operated for a considerable number of kilowatt hours, it is necessary to remove these gaseous fission products from the recirculating oxygen. The preferred method of removal of the gaseous fission products without venting to the atmosphere is as follows. The reactor is shut down by insertion of the control rods. Valves 41 and 42 are opened and valve 47 is closed. The gases now circulate through fission gas disposal system 23. Referring now to FIG. 4, a schematic drawing of fission gas disposal system 23 is shown. After passing through valve 41, the gases are conducted to water trap 57 which is surrounded by refrigerating unit 58. Any small amount of water vapor which might have passed condenser 20 is removed from the gases at this point. Refrigerator unit 58 preferably cools the gases to below the freezing point of water, thereby insuring that no water is lost from the system by subsequent adsorption in adsorbers 59 and 60. The gases are then conveyed through heater 61 to nitrogen combiner 62. Heater 61 is a conventional adjustable heater which raises the temperature of the gases by passing them over a hot surface. Increasing the temperature of the gases increases the efficiency of nitrogen combiner 62. The purpose of nitrogen combiner 62 is to remove spurious nitrogen which may have leaked into the gas recirculating system from the outside atmosphere during normal operations. As previously pointed out, the entire gas recirculating system is operated below atmospheric pressure. Therefore, any leaks in the system are inleaks. The leaking air, composed primarily of nitrogen, contaminates the recirculating oxygen medium. There is also the possibility of a formation of nitric acid and the undesired mixing of nitric acid and the uranyl sulfate solution. The presence of a leak in the system is readily detected by pressure regulator 33, which is explained in detail later. The leak itself is detected and repaired by conventional means. However, the nitrogen which has already leaked into the system must be removed. This is accomplished by nitrogen combiner 62. There are several combiners which can be used to effectively combine this small amount of nitrogen with oxygen, to ultimately form nitrogen dioxide. Among these are a low frequency arc discharge combiner, utilizing the well known Birkeland and Eyde process, a high frequency discharger recombiner, and an ultra high frequency discharge recombiner. The nitric oxide thus formed oxidizes to nitrogen dioxide which is subsequently adsorbed by the silica gel in adsorber 59.

Ozone decomposition chamber 63 decomposes to molecular oxygen the ozone formed in the nitrogen combiner. Decomposition chamber 63 may be a catalytic ozone decomposition device utilizing a metal such as platinum as the catalyst. Heat can also be used to decompose the ozone. Ozone, if not decomposed condenses in adsorber 59 on the silica gel. This combination is an explosive hazard and is eliminated by positioning ozone decomposition chamber 63 between nitrogen combiner 62 and adsorber 59. The gases are conveyed through valve 64 to cooler 65 and adsorber 59 in refrigerator unit 66. Here the gases are cooled to approximately liquid oxygen temperatures. At this temperature, the gaseous fission products, krypton and xenon, liquefy. Adsorber 59 is preferably a tank filled with silica gel. As the gases pass through the silica gel in adsorber 59, the liquefied gaseous fission products and nitrogen dioxide are adsorbed by the silica gel while the oxygen which remains a gas passes through. After circulating all of the gas in the gas recombination system through gas disposal system 23 several times, substantially all of the gaseous fission products are removed.

The reactor is now ready to be placed in operation. Valve 47 is opened and valves 41 and 42 are closed thereby once again isolating gas disposal system 23. The reactor is started up by adjusting control rod 92 and operated for a predetermined number of kilowatt hours before once again removing gaseous fission products. While the reactor is in normal operating condition, the gaseous fission products and nitrogen dioxide which were adsorbed by the silica gel in adsorber 59 are conveniently removed without bleeding to the atmosphere. This cleaning of the silica gel in adsorber 59 is accomplished by opening valves 67 and 68. Valve 64 is closed. Adsorber 59 is heated by increasing the temperature of refrigerator unit 66. At the same time the temperature of disposable adsorber 60 is decreased to approximately liquid oxygen temperatures. Refrigerator unit 69 is used to accomplish the cooling of adsorber 60. Disposable adsorber 60 is also filled with silica gel. By increasing the temperature of adsorber 59 while decreasing the temperature of adsorber 60, the silica gel in adsorber 59 releases the previously adsorbed products and they are allowed to flow by natural process into adsorber 60 where they are once again adsorbed by the silica gel. After substantially all of the products have been transferred from adsorber 59 to adsorber 60 valves 67 and 68 are closed and adsorber 60 removed and disposed of in a convenient manner.

At this time, the temperature of refrigerator unit 58 is increased above the melting point of water and valve 43 is opened. Any water which has been trapped in water trap 57 is thereby returned to solution 6 through water trap 32. Valve 43 is then closed in preparation for the next fission gas removal cycle.

As previously pointed out, it is anticipated that the fission gases could be continuously removed. This is accomplished by leaving valves 41 and 42 open a predetermined amount. The gases leaving blower 8 thereupon split, with a predetermined portion going through recombiners 27 and 28 and the rest through fission gas disposal system 23. Valves 43, 67, and 68 are maintained closed. Periodically, valves 41 and 42 and 64 are closed, and adsorber 59 cleaned in the manner previously described. At the same time, the water in water trap 57 is permitted to return to solution 6 by opening valve 43. Other means of periodically disposing of the gaseous fission products without venting to the atmosphere are anticipated. Specific alternate methods are described later.

Figure 5:
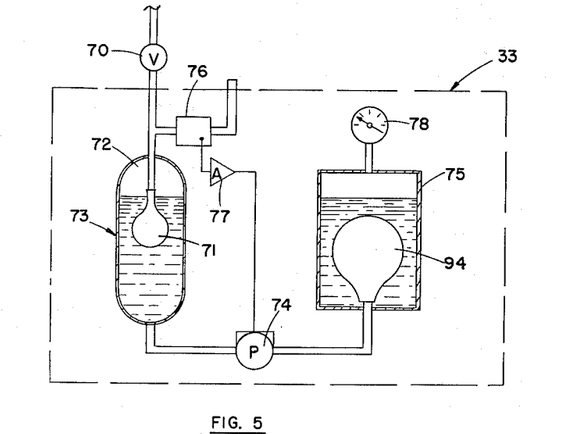
FIG. 5 is a schematic sectioned view of a preferred pressure regulator utilized in the preferred embodiment of a sealed closed cycle gas recirculating system contemplated by this invention.
Figure 8:
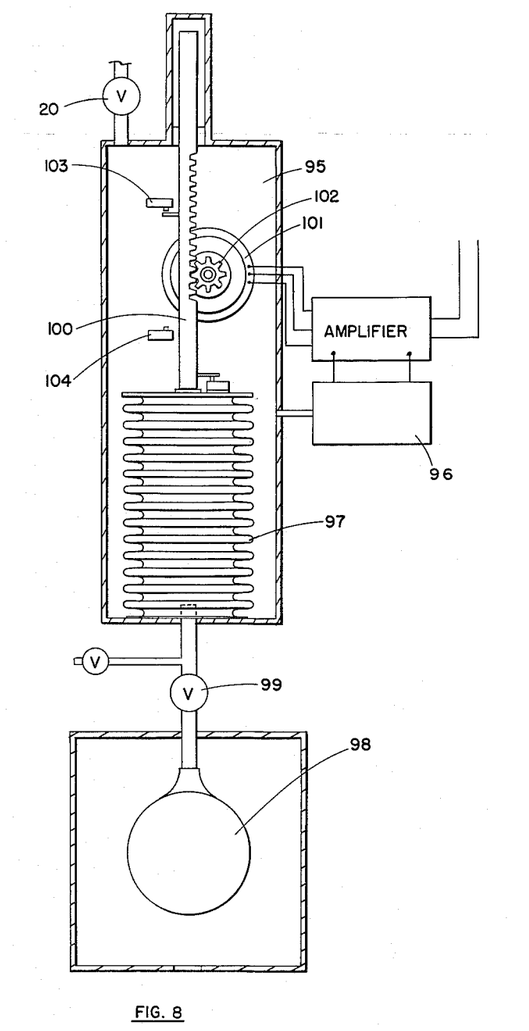
FIG. 8 is a schematic diagram of an alternate pressure regulator for maintaining the gas pressure in the gas recirculating system at a predetermined level.
Figure 9:
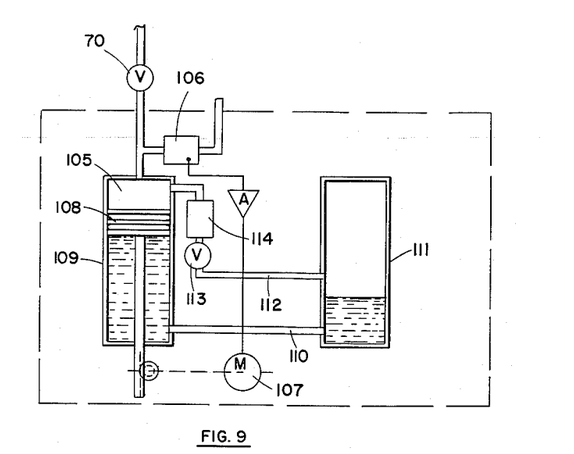
FIG. 9 is a schematic diagram of another alternate pressure regulator.
Figure 10:
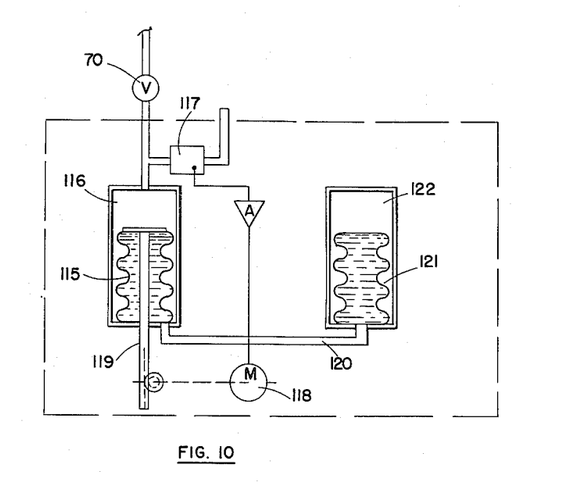
FIG. 10 is a schematic diagram of still another alternate pressure regulator.

As previously pointed out, the pressure in the gas recirculation system is preferably maintained below that of the outside atmosphere in order to prevent leaks of radioactive gases into the surrounding atmosphere. This pressure is regulated by pressure regulator 33. A preferred type of pressure regulator is shown schematically in FIG. 5. Other types of pressure regulators are shown in FIGS. 8, 9, and 10. Referring to FIG. 5, valve 70 between pressure regulator 33 and the gas recirculation system is normally maintained open. Since the connection is made on the high pressure side of blower 8, the pressure inside flexible balloon 71 in chamber 72 of accumulator 73 is always equal to the maximum pressure in the system. Chamber 72 is tightly sealed from the outside atmosphere. Water is placed between the walls of chamber 72 and balloon 71. Chamber 72 is connected through reversible positive displacement pump 74 to balloon 94 in pressure tank 75. The purpose of balloon 94 is to further isolate the gases in the recirculating system from the outside atmosphere. A leak in balloon 71 results in radioactive gases dissolving in the water in chamber 72. Balloon 94 prevents these dissolved radioactive gases from accumulating above the surface of the water in tank 75.

Pressure sensitive device 76 is sensitive to the pressure differential between the gases in the recirculation system and the outside atmosphere. Pressure device 76 may be a conventional bellows type detector equipped with a pick off to give an electrical output which is a function of the pressure differential. When the pressure in the system increases, thereby causing the pressure differential to decrease below a pre-set value, the output of pressure sensitive device 76 actuates reversible pump 74 through amplifier 77 to pump water from chamber 72 to balloon 94 in tank 75. The removal of water from chamber 72 allows expansion of balloon 71, thereby restoring the pressure in the recirculation system to its original value. Pressure tank 75 is preferably sealed from the outside atmosphere. A small volume of air, initially at approximately atmospheric pressure is trapped above the water in tank 75. The pressure of the gas trapped above the water in pressure tank 75 is indicated by pressure indicating device 78. The pressure indicated by device 78 is a measure of the amount of water transferred between chamber 72 and balloon 94. Therefore, it is also a measure of the amount of increase or decrease in volume of the gases of the recirculation system. Thus, an increase in gas in the system, such as is caused by a leak in the tubing, is readily detected by a gradual increase in pressure indicated by indicator 78. Operating personnel thereupon can detect and fix the point of leakage by conventional methods. The nitrogen which has leaked in is removed by gas disposal system 23 as previously described. It is to be noted that the pressure regulator 33 operates in a similar manner to compensate for a decrease in pressure in the recirculating system. Pump 74 in response to pressure sensitive device 76 pumps water from balloon 94 to chamber 72, thereby compressing balloon 71 and restoring the pressure of the gases in the recirculating system.

Referring now to FIG. 8, an alternate pressure regulator is shown. Valve 70 connects chamber 95 to the gas recirculating system. The pressure in chamber 95 is therefore maintained at all times equal to the highest pressure in the gas recirculating system. Pressure sensitive device 96 is sensitive to the pressure differential between the gas in chamber 95 and the outside atmosphere. Sealed bellows 97 is adjustable by the movement of rack 100. Any leakage to the outside atmosphere due to a leak in bellows 97 is prevented by connecting the inside of the bellows to balloon 98 through valve 99. Pinion 102 of rack 100 is driven by motor 101. Motor 101 is responsive to the output of pressure sensitive device 96. Limit switches 103 and 104 determine the maximum travel of rack 100. Excessive downward movement of bellows 97, as occurs when air leaks into the recirculating system, causes actuation of limit switch 104. Limit switch 104 is preferably connected by conventional electronic and mechanical means (not shown) to shut down the reactivity of the core when tripped by actuating insertion of safety rod 93. An additional feature of this design provides protection in the event of a reactor runaway. During a runaway the pressure in the gas recombination system increases rapidly. Since rack 100 is not rigidly connected to bellows 97, the increase in pressure in chamber 95 forces bellows 97 to rapidly compress, thereby quickly reducing the pressure in the gas recirculating system.

Referring now to FIG. 9, a further alternate type of pressure regulator is shown. Valve 70 connects chamber 105 to the gas recirculating system. Pressure sensitive device 106 is sensitive to the pressure differential between the gas in the recirculating system and the outside atmosphere. A change in this pressure differential results in actuation of motor 107 to drive piston 108 in a direction to restore the differential. A liquid seal is preferably attained between piston 108 and cylinder 109 by filling the chamber on the lower side of piston 108 with water. If piston 108 is moved downward by the action of motor 107 the water is displaced through tube 110 to storage tank 111. Since the movement of a piston in a cylinder is always susceptible to leakage, provision is made for removing any water which leaks into chamber 105 and to remove any gas which leaks to the lower side of piston 108. Tube 112 connects tank 111 through normally closed valve 113 to chamber 105. Water is removed from chamber 105 by raising the upper surface of piston 108 to a point level with the entrance to tube 112 in chamber 105. Any liquid in chamber 105 therefore flows into pipe 112 and is readily visible in water glass 114. Opening valve 113 successfully bleeds this water into tank 111. Again closing valve 113 piston 108 is raised until its lower surface is even with the inlet to pipe 112. Opening valve 113 now allows any gas trapped below piston 108 to flow into tube 112. This gas is never permitted to pass through valve 113 but is stopped while still visible in water glass 114. Closing valve 113 and returning piston 108 to its normal operating position thereby returns the gas to chamber 105.

Referring now to FIG. 10, an alternate bellows-type pressure regulator is shown. A water-tight seal is provided inside bellows 115 to thereby prevent leakage of radioactive gases from chamber 116 to the outside atmosphere. Pressure sensitive detector 117 actuates motor 118 to drive rack 119 in a direction and of a magnitude to maintain a preset pressure differential. Any fluid forced from the inside of bellows 115 is conveyed through tube 120 to bellows 121 in sealed tank 122.

When the fuel in solution 6 has burned up to a point where continued operation of reactor 1 is not feasible without replacing or processing the solution, it is desirable the flush the gas recirculation system at the same time as the solution is removed. The procedure used is to first shut down the reactor by inserting control rod 92 and safety rod 93. Blower 8 continues to recirculate the gases through the recombiners for some time in order to recombine as much of the hydrogen and oxygen as possible. The gases are then purged of all the gaseous fission products by circulating the gases through gas disposal system 23 as previously described. The gaseous fission products are then transferred to disposable adsorber 69 in the manner previously described. The gases remaining in the system are now substantially pure oxygen with only a minute amount of impurities. Solution 6 is cooled to approximately room temperature by the continued circulation of cooling water through coils 12.

All except a few cc. of solution 6 is now removed through valve 34 and filler vessel 35. Sphere 5 is then flushed several times with distilled water, thereby removing substantially all of the solution containing fissionable material. A small amount of distilled water is left in sphere 5 after the final flushing. This is done to insure that none of the gases in the gas recombiner system can possibly leak out through filler vessel 35.

Figure 7:
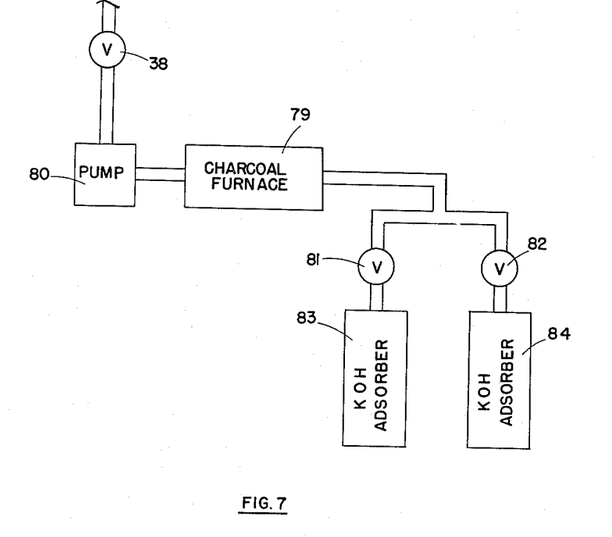
FIG. 7 is a schematic flow diagram of a preferred embodiment of an oxygen disposal system utilized as an alternate fission gas disposal system.

Removal of the oxygen is accomplished with valves 34, 36, 37, and 67 closed. All of the other valves are opened. Connected to the system through valve 38 is an oxygen disposal system. A convenient disposal system is shown in FIG. 7. The conversion of the oxygen to carbon dioxide in charcoal furnace 79 is preferred to a compression and liquefaction of the oxygen. The input side of Toeppler pump 80 is connected to valve 38. Pump 80 evacuates the gas recombiner system and discharges the oxygen into charcoal furnace 79. Substantially all of the oxygen is there converted to carbon dioxide. Since great volumes of gaseous carbon dioxide are easily adsorbed by potassium hydroxide, a huge storage tank is not necessary. The carbon dioxide is conveyed from furnace 79 through valves 81 and 82 to disposable containers 83 and 84 respectively. Containers 83 and 84 are filled with KOH adsorbers. After the pressure in the recombiner system is reduced to a very low value by the action of pump 80, the small amount of water in sphere 5 vacuum boils and is stored in containers 83 and 84.

In order to insure that all of the gases have been removed from the gas recombiner system, repeated filling of the circuit with oxygen through valve 36 and evacuation through valve 38 is recommended. KOH adsorbers 83 and 84 are designed with a capacity for adsorption of $CO_2$ of many times the volume formed by the burning of all the oxygen normally in the recombiner system. It is anticipated that any gas disposal system, although preferably one which stores a large volume of gas in a small space, can replace charcoal furnace 79 and KOH adsorbers 83 and 84. As an example, a container filled with white phosphorus can be connected to the output of Toeppler pump 80. The phosphorus readily combines with oxygen to form $P_2O_5$, a powder.

It is also to be noted that, as an alternative, the oxygen disposal system can be used in place of fission gas disposal system 23 to preferably remove the gaseous fission products. In this event solution 6 is not removed from sphere 5. Solution 6 is cooled to a low temperature by cooling coils 12 and the gas is passed through recombiners 27 and 28 several times after reactor shut down to insure recombining all the hydrogen with oxygen. Pump 80 then removes most of the gases which are easily adsorbed in containers 83 and 84. A partial pressure is maintained in the recombiner system to prevent vacuum boiling solution 6. The system is then flushed with pure oxygen several times and finally filled with oxygen. Operations can then be renewed. Once again other means may be substituted for KOH adsorbers 83 and 84.

Figure 6:
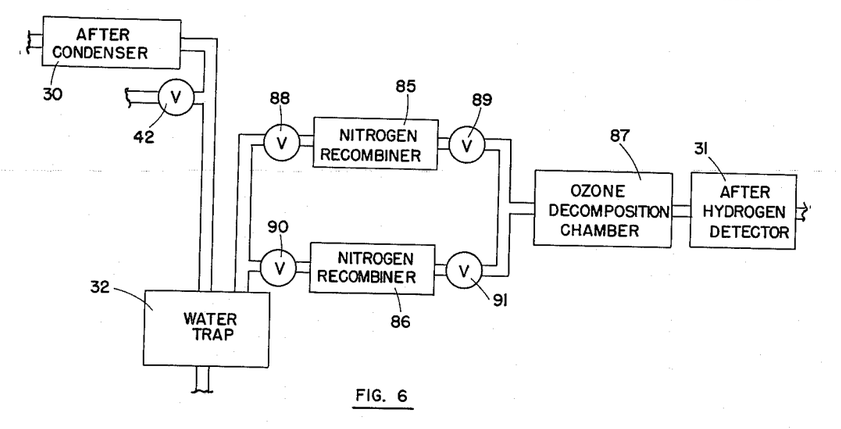
FIG. 6 is a schematic flow diagram of a modification of the diagram of FIG. 1.

Thus far, the description has specified the use of an enriched uranyl sulfate solution. Substantially the same circuit can be used to handle the gases from an enriched uranyl nitrate solution. It is, however, necessary to add a nitrogen-oxygen recombiner in the recirculating system particularly if the uranyl nitrate salt is not highly enriched. Nitrogen recombiners 85 and 86 are preferably connected in parallel as shown in FIG. 6. The recombiners and ozone decomposition chamber 87 are preferably connected in series between after-condenser 30 and after-hydrogen detector 31. Recombiner 85 is maintained in a standby condition with valves 88 and 89 closed. The recirculating gases, which now contain a small amount of nitrogen formed by the decomposition of the nitrate ion, as previously described, flow through valve 90 to recombiner 86. Recombiners 85 and 86 are preferably of conventional design, such as a low frequency arc recombiner, a high frequency discharge recombiner, or an ultra high frequency discharge recombiner. The capacity, i.e., the rate of production of nitric acid, of the recombiner is by design greater than the maximum possible decomposition rate in the core of the reactor. This maximum decomposition rate is determined by two factors. First, the concentration of the nitrate ion in the solution. This in turn is a function of the enrichment of the uranyl salt. Second the maximum power at which the reactor is to be operated. The nitric acid generated in recombiner 86 passes through valve 91 and is returned to solution 6 in sphere 5.

Although the methods of operating an unvented closed cycle water boiler reactor utilizing water solutions of two specific salts, i.e., uranyl sulfate and uranyl nitrate, have been described in detail, this invention is not limited to those specific solutes and solvents. For example, the sulfates and nitrates of plutonium, another fissionable material, are readily soluble in water, and can be used in solution in core 2. Further deuterium oxide is actually preferable from a nuclear point of view to water as the solvent. Other soluble salts of fissionable materials and other solvents can therefore be used.

The unvented closed cycle water boiler reactor described above is a great advance over the present state of the art. It makes possible the use of a reactor of this type in any hospital or other research facility. It is no longer necessary that the facility be located in a sparsely populated area. The water boiler reactor of this invention makes this possible because it does not at any time vent radioactive gases into the atmosphere, and provides the ultimate in protection against radioactive contamination of the surrounding area. The entire gas circuit is completely sealed from the outside atmosphere at all times and preferably operates below atmospheric pressure. In order to operate on the closed cycle principle a system of recombining the gases formed by the decomposition of the solute and solvent under irradiation is provided. The periodic removal of the gaseous fission products without venting to the surrounding atmosphere is also provided.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A liquid homogeneous nuclear reactor providing ultimate protection of the surrounding area against radioactive contamination comprising a water boiler reactor having a liquid homogeneous solution of fissionable material for a core, sealed closed cycle gas recirculating means operating in an oxygen carrier medium connected to accumulate, recirculate, and recombine the gases generated in said solution, and means for disposing of the gaseous fission products generated in said solution whereby a nuclear research reactor capable of producing neutrons in congested localities is produced, wherein said water boiler reactor utilizes a water solution of enriched uranyl nitrate and in which said gas recirculating means includes a hydrogen-oxygen recombiner and a nitrogen-oxygen recombiner whereby the hydrogen, oxygen, and nitrogen formed by the decomposition of said uranyl nitrate solution are continuously recombined and returned to said solution by said closed cycle gas recirculating means.

2. A liquid homogeneous nuclear reactor providing ultimate protection of the surrounding area against radioactive contamination comprising a water boiler reactor having a water solution of enriched uranyl salt selected from the class consisting of uranyl nitrate and uranyl sulfate for a core, catalytic hydrogen-oxygen recombiner means, sealed closed cycle gas recirculating means operating in an oxygen carrier medium and connected to accumulate and recirculate the gases generated in said uranyl salt solution through said hydrogen-oxygen recombiner, and means integrally connected to said recirculating means for absorbing the gaseous fission products generated in said solution whereby the hydrogen and oxygen formed by the decomposition of said water under irradiation in said core are continuously recombined by said hydrogen-oxygen recombiner and returned to said solution by said sealed closed cycle gas recirculating means.

3. A nuclear research reactor as recited in claim 2 in which said solution is a water solution of uranyl nitrate having an above critical mass of U-235 and in which said gas recombiner means includes a nitrogen-oxygen recombiner whereby the hydrogen, oxygen, and nitrogen formed by the decomposition of said uranyl nitrate solution are continuously recombined to form water and nitric acid.

4. A nuclear research reactor as recited in claim 3 in which said fission gas disposal means comprises silica gel adsorber means, means for reducing the temperature of said silica gel adsorber means, and means for passing the gases formed in said core through said silica gel whereby gaseous fission products are adsorbed by said silica gel.

5. A liquid homogeneous nuclear reactor providing ultimate protection of the surrounding area against radioactive contamination comprising a water boiler reactor having a water solution of enriched uranyl nitrate for a core, hydrogen-oxygen recombiner means, nitrogen-oxygen recombiner means, sealed closed cycle gas recirculating means operating in an oxygen carrier medium and connected to accumulate and recirculate the gases generated in said solution through said hydrogen-oxygen recombiner and said nitrogen-oxygen recombiner, and means connected to said recirculating means for disposing of the gaseous fission products generated in said solution whereby the hydrogen, oxygen, and nitrogen formed by the decomposition of the uranyl nitrate solution are continuously recombined and returned to said solution by said closed cycle gas recirculating means.

6. A nuclear research reactor as recited in claim 5 in which said fission product disposal means comprises silica gel adsorber means, means for reducing the temperature of said silica gel adsorber means, and means for passing the gases formed in said core through said silica gel whereby the gaseous fission products are adsorbed by said silica gel.

7. A nuclear research reactor capable of being safely operated in populous areas comprising a water boiler reactor having a liquid solution of fissionable material and sealed closed cycle gas recirculating means connected to said reactor, said gas recirculating means comprising catalytic gas recombiner means adapted to recombine the gases formed by the decomposition of said solution, means for accumulating and recirculating the gaseous products of said reactor through said gas recombiner means in an oxygen carrier medium, means integrally connected with said recombiner means for absorbing the gaseous fission products of the solution without venting to the atmosphere, and means for maintaining the pressure in said gas recirculating means at a constant predetermined level.

8. A liquid core homogeneous nuclear reactor capable of being operated safely without contaminating the surrounding area or atmosphere comprising a reactive core having a container and a liquid solution of fissionable material, said solution containing at least a critical mass of said fissionable material; means for controlling the reactivity of said core; a suitable radiation shield surrounding said core and having appropriate irradiation facilities; cooling means in said core having a capacity sufficient to maintain the temperature of said solution below its boiling point at all times; platinized alumina catalytic gas recombiner means adapted to recombine the gases formed by the decomposition of the liquid solution under irradiation; sealed fission gas absorption means, said reactor, catalytic recombiner and gas absorber being mutually interconnected; closed cycle gas recirculating means for continuously circulating an atmosphere of oxygen through said gas recombiner means and over the surface of said solution, said oxygen mixing with the gases generated in said solution and carrying said gases through said catalytic gas recombiner means; means for periodically deflecting the flow of said oxygen carrier around said gas recombiner means and through said fission gas absorption means while said reactor is operating and means for maintaining the pressure in said closed cycle recirculating system below that of the outside atmosphere whereby said nuclear reactor is sealed from the outside atmosphere while in operation as a source of neutrons.

9. A nuclear reactor as recited in claim 8 and further comprising means for detecting the percentage composition of explosive gases in said recirculating means and means for shutting down said reactivity of said core in response to said explosive mixture detecting means.

10. A nuclear reactor as recited in claim 9 in which said liquid solution is a water solution of enriched uranyl nitrate containing at least a critical mass of U-235, and in which said gas recombiner means comprises a catalytic hydrogen-oxygen recombiner and a nitrogen-oxygen recombiner having capacities sufficient to recombine the hydrogen, oxygen, and nitrogen formed by the decomposition of said solution under irradiation at the same rate as it is formed with the state of equilibrium attained with the hydrogen content of the recirculating gases below the lower explosive limit.

11. A closed-cycle gas-handling system for an aqueous homogeneous reactor which comprises a gas outlet line from said reactor for passing a gaseous mixture comprising radiolytic and fission product gases, water vapor, and oxygen carrier gas to a catalytic hydrogen-oxygen recombiner system communicating with said outlet line, a fission product gas absorption system communicating with said outlet line and said recombiner, means for circulating and distributing the flow of said gaseous mixture from said reactor between said recombiner and absorption systems, a return line to said reactor from said recombiner for reconstituted water, and means associated with said recombiner system for regulating pressure within said recombiner system at a predetermined level.

12. The system of claim 11, wherein said gas recombiner system includes interconnected temperature adjustment means, explosion trap means, platinized alumina catalytic recombiner means, and hydrogen measuring means.

13. The gas handling system of claim 11, wherein hydrogen measuring means are provided in said system, said hydrogen measuring means being associated with the reactor safety control system to shut the reactor down in the event of excessive hydrogen buildup.

14. An improved gas handling system for a water-boiler reactor comprising a sealed closed cycle system communicating with the core of said reactor, said system having a catalytic recombiner, a fission gas absorber, and means for circulating the gaseous products formed by reactor operation through said system in an oxygen carrier gas medium, said circulating means being adapted to distribute said gases between said recombiner and said absorption means, and said circulation means being further adapted to return reconstituted water to said reactor core from said recombiner.

15. A liquid homogeneous nuclear reactor providing ultimate protection of the surrounding area against radioactive contamination comprising a water boiler reactor having a water solution of enriched uranyl sulfate for a core, catalytic hydrogen-oxygen recombiner means, sealed closed cycle-gas recirculating means operating in an oxygen carrier medium and connected to accumulate and recirculate the gases generated in said uranyl sulfate solution through said hydrogen-oxygen recombiner, whereby the hydrogen and oxygen formed by the decomposition of said water under irradiation in said core are continuously recombined by said hydrogen-oxygen recombiner and returned to said solution by said sealed closed cycle gas recirculating means; and means integrally connected to said recirculating means for absorbing the gaseous fission products generated in said solution comprising carbon furnace means for combining said oxygen carrier medium with carbon to form carbon dioxide, means for storing said carbon dioxide and said gaseous fission products without venting to the atmosphere, means for periodically passing substantially all the gases in said sealed gas recirculating means through said furnace means, and means for refilling said sealed gas recirculating means with substantially pure oxygen, whereby the gaseous fission products are periodically removed from said recirculating means without contaminating the surrounding atmosphere.

16. A liquid homogeneous nuclear reactor providing ultimate protection from the surrounding area against radioactive contamination comprising a water boiler reactor having a water solution of enriched uranyl sulfate for a core, catalytic hydrogen-oxygen reecombiner means, sealed closed cycle gas recirculating means operating in an oxygen carrier medium and connected to accumulate and recirculate the gases generated in said uranyl sulfate solution through said hydrogen-oxygen recombiner, whereby the hydrogen and oxygen formed by the decomposition of said water under irradiation in said core are continuously recombined by said hydrogen-oxygen recombiner and returned to said solution by said sealed closed cycle gas recirculating means; and means integrally connected to said recirculating means for disposing of the gaseous fission products generated in said solution comprising a container, white phosphorous positioned within said container, means for periodically passing substantially all the gases in said sealed recirculating means into said container, and means for refilling said sealed gas recirculating means with substantially pure oxygen, whereby the oxygen in said gases combines with the phosphorous in said container to form phosphorous pentoxide and the gaseous fission products are stored in said container.

17. A liquid homogeneous nuclear reactor providing ultimate protection of the surrounding area against radioactive contamination comprising a water boiler reactor having a water solution of enriched uranyl nitrate for a core, catalytic hydrogen-oxygen recombiner means, nitrogen-oxygen recombiner means, sealed closed cycle gas recirculating means operating in an oxygen carrier medium and connected to accumulate and recirculate the gases generated in said uranyl nitrate solution through said hydrogen-oxygen recombiner and said nitrogen-oxygen recombiner, whereby the hydrogen, oxygen, and nitrogen formed by the decomposition of the uranyl nitrate solution are continuously recombined and returned to said solution by said sealed closed cycle gas recirculating means; and means integrally connected to said recirculating means for disposing of the gaseous fission products generated in said solution comprising carbon furnace means for combining said oxygen carrier medium with carbon to form carbon dioxide, means for storing said carbon dioxide and said gaseous fission products without venting to the atmosphere, means for periodically passing substantially all the gases in said sealed gas recirculating means through said furnace means, and means for refilling said sealed gas recirculating means with substantially pure oxygen, whereby the gaseous fission products are periodically removed from said recirculating means without contaminating the surrounding atmosphere.

18. A liquid homogeneous nuclear reactor providing ultimate protection from the surrounding area against radioactive contamination comprising a water boiler reactor having a water solution of enriched uranyl nitrate for a core, catalytic hydrogen-oxygen recombiner means, nitrogen-oxygen recombiner means, sealed closed cycle gas recirculating means operating in an oxygen carrier medium and connected to accumulate and recirculate the gases generated in said uranyl nitrate solution through said hydrogen-oxygen recombiner and said nitrogen-oxygen recombiner, whereby the hydrogen, oxygen, and nitrogen formed by the decomposition of the uranyl nitrate solution are continuously recombined and returned to said solution by said sealed closed cycle gas recirculating means; and means integrally connected to said recirculating means for disposing of the gaseous fission products generated in said solution comprising a container, white phosphorous positioned within said container, means for periodically passing substantially all the gases in said sealed recirculating means into said container and means for refilling said sealed gas recirculating means with substantially pure oxygen, whereby the oxygen in said gases combines with the phosphorous in said container to form phosphorous pentoxide and the gaseous fission products are stored in said container.

19. A nuclear research reactor capable of being safely operated in populous areas comprising a water boiler reactor and sealed closed cycle gas recirculating means connected to said reactor, said gas recirculating means comprising catalytic gas recombiner means adapted to recombine the gases formed by the decomposition of said solution, means for accumulating and recirculating the gaseous products of said reactor through said recombiner means in an oxygen carrier medium, means integrally connected with said recombiner means for absorbing the gaseous fission products of the solution without venting to the atmosphere, and means for maintaining the pressure in said gas recirculating means at a constant predetermined level comprising a flexible balloon connected to said recirculating means, pressure sensitive means responsive to the pressure in said gas recirculating means, and servo means for adjusting the volume of said balloon in response to said pressure sensitive means in a manner to maintain the pressure in said gas recirculating means at a predetermined level.

20. A nuclear research reactor capable of being safely operated in populous areas comprising a water boiler reactor and sealed closed cycle gas recirculating means connected to said reactor, said recirculating means comprising catalytic gas recombiner means adapted to recombine the gases formed by the decomposition of said solution, means for accumulating and recirculating the gaseous products of said reactor through said gas recombiner means in an oxygen carrier meduim, means integrally connected with said recombiner means for absorbing the gaseous fission products of the solution without venting to the atmosphere, and means for maintaining the pressure in said gas recirculating means at a constant predetermined level comprising a bellows, means subjecting one side of said bellows to the gas pressure in said gas recirculating means, pressure sensitive means responsive to the pressure in said gas recirculating means, and servo means for adjusting the position of said bellows in response to said pressure sensitive means in a manner to maintain the pressure in said gas recirculating means at a predetermined level.

21. A nuclear research reactor capable of being safely operated in populous areas comprising a water boiler reactor and sealed closed cycle gas recirculating means connected to said reactor, said recirculating means comprising catalytic gas recombiner means adapted to recombine the gases formed by the decomposition of said solution, means for accumulating and recirculating the gaseous products of said reactor through said gas recombiner means in an oxygen carrier medium, means integrally connected with said recombiner means for absorbing the gaseous fission products of the solution without venting to the atmosphere, and means for maintaining the pressure in said gas recirculating means at a constant predetermined level comprising a cylinder, piston means adapted to move longitudinally in said cylinder while maintaining a tight seal, means subjecting a first side of said piston to the pressure of the gases in said gas recirculating means, pressure sensitive means responsive to the pressure in said gas recirculating means, and servo means for adjusting the position of said piston in response to said pressure sensitive means to maintain pressure in said gas recirculating means at a predetermined level.

22. A nuclear research reactor as recited in claim 21 in which said means for maintaining the pressure in said gas recirculating means further includes a liquid seal maintained on a second side of said piston means, for returning any liquid on said first-named side of said piston to said second-named side, and means for returning any gases which accumulate on the second-named side of said piston means to said first-named side.

23. A closed cycle gas-handling system for an aqueous homogeneous reactor which comprises a gas outlet line from said reactor for passing a gaseous mixture comprising radiolytic fission product gases, water vapor, and oxygen carrier gas to a catalytic hydrogen-oxygen recombiner system communicating with said outlet line, said recombiner comprising, in series, a condenser, a heater, hydrogen measuring means, an explosion trap, a catalytic recombiner of platinized alumina pellets, a second explosion trap, a second condenser, and a second hydrogen measuring means; a fission product gas absorption system communicating with said outlet line in said recombiner; means for circulating and distributing the flow of said gaseous mixture from said reactor between said recombiner and absorption system, a return line to said reactor from said recombiner for reconstituted water, and means associated with said recombiner system for regulating pressure within said recombiner system at a predetermined level.

References Cited in the file of this patent

AECD–3063, U.S. Atomic Energy Commission, document dated September 4, 1944; pages 2, 3, 20.

United States Atomic Energy Commission ORO 33 Program Administration and Installation Design of the Nuclear Reactor Project at North Carolina State College by Clifford K. Beck et al., July 5, 1950, pages 14, 16, 22, 23, 24, 25, 26, 43, 44, 45, 46, 47, 52, 57, 58, 59, 74. (Copies of above obtainable from A.E.C. Oak Ridge, Tenn.)

LA–1337 Los Alamos Scientific Laboratory of the University of California. Report issued: March 6, 1952. Gas Recombination System of the Los Alamos Homogeneous Reactor by M. E. Bunker et al., pages 1–27. (Abstract appeared in Nuclear Science Abstracts of vol. 6, No. 7, page 275, abstract no. 278 of April 15, 1952.)

The Reactor Handbook, vol. 2, Engineering, Declassified edition (May 1955), Pub. by Technical Information Service, U.S. Atomic Energy Comm., pp. 1033–1037, 985.